United States Patent [19]

Fonseca

[11] Patent Number: 5,640,447
[45] Date of Patent: *Jun. 17, 1997

[54] DEBIT CALLING LABEL

[76] Inventor: David Fonseca, 3208 Saddlehorn Dr., Lawrence, Douglas County, Kans. 66049

[*] Notice: The term of this patent shall not extend beyond the expiration date of Pat. No. 5,629,977.

[21] Appl. No.: 113,193

[22] Filed: Aug. 30, 1993

[51] Int. Cl.⁶ .................. H04M 15/00; H04M 17/00; G06K 5/00; G06G 7/48
[52] U.S. Cl. .................. 379/144; 379/112; 379/114; 379/357; 235/380; 235/382; 364/479.05; 364/479.07
[58] Field of Search ............... 379/91, 111, 112, 379/114, 144, 357, 355; 40/335, 336, 630; 235/375, 376, 380–382; 156/64, 270, 277, 152; 118/264, 268; 364/479.03, 479.05, 479.07

[56] References Cited

U.S. PATENT DOCUMENTS

| | | | |
|---|---|---|---|
| 4,329,191 | 5/1982 | Barber | 156/277 |
| 4,535,204 | 8/1985 | Hughes et al. | 379/357 |
| 4,706,275 | 11/1987 | Kamil | 374/144 |
| 4,815,125 | 3/1989 | Al-Rawi | 379/357 |
| 4,817,136 | 3/1989 | Rhoads | 379/91 |
| 4,849,615 | 7/1989 | Mollet | 235/380 |
| 4,897,865 | 1/1990 | Camuel | 379/144 |
| 4,900,902 | 2/1990 | Sakakibara | 235/375 |
| 4,941,172 | 7/1990 | Winebaum | 379/355 |
| 5,138,650 | 8/1992 | Stahl et al. | 374/114 |
| 5,155,342 | 10/1992 | Urano | 235/380 |
| 5,237,164 | 8/1993 | Takada | 235/382 |
| 5,251,251 | 10/1993 | Barber et al. | 379/357 |
| 5,282,649 | 2/1994 | Williams | 283/56 |
| 5,442,567 | 8/1995 | Small | 364/479 |
| 5,469,497 | 11/1995 | Pierce | 379/144 |
| 5,513,117 | 4/1996 | Small | 364/479 |

FOREIGN PATENT DOCUMENTS

| | | | |
|---|---|---|---|
| 1251942 | 10/1989 | Japan | 374/144 |
| 212854 | 5/1990 | Japan | 379/144 |

Primary Examiner—Curtis Kuntz
Assistant Examiner—Vijay Shankar
Attorney, Agent, or Firm—Senniger, Powers, Leavitt & Roedel

[57] ABSTRACT

A debit calling label for allowing telephone charges to be credited against a prepaid account is disclosed. The debit calling label preferably includes a label, an account number printed on the label, and an adhesive secured between the label and a backing such that when the backing is removed, the label is adapted to be secured to an item. The debit calling label also preferably includes an additional label having a numeral representing the amount of time associated with the account code. The calling label and the number label are adapted to be used on items specifically manufactured for use with the labels. These items preferably have designated areas for securing the labels thereto and corresponding instructions concerning use of the debit label to place telephone calls against the prepaid calling credit account. In an alternative embodiment, the label includes the account code, the amount of time associated with the account code, and the instructions. The label according to this alternative embodiment is adapted to be used with items which were not specifically manufactured for use with the label.

22 Claims, 3 Drawing Sheets

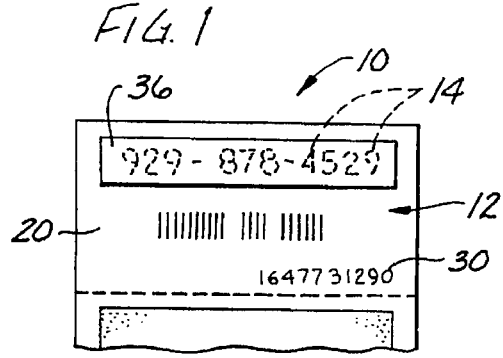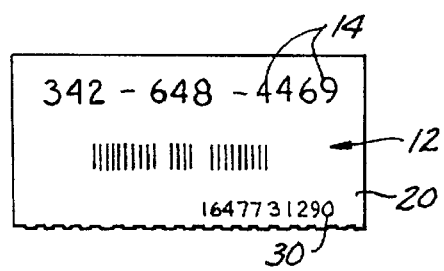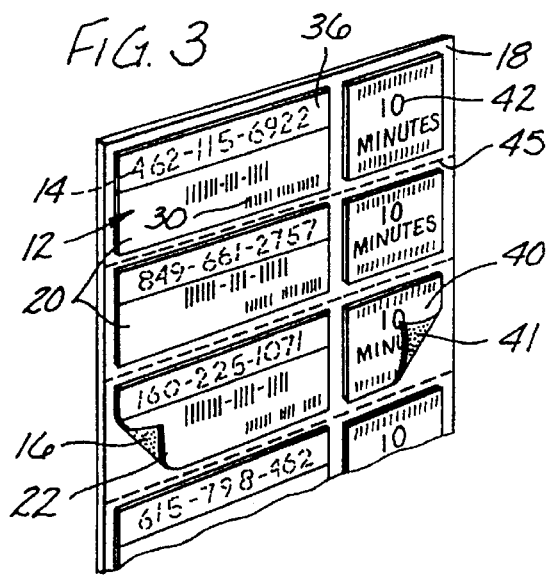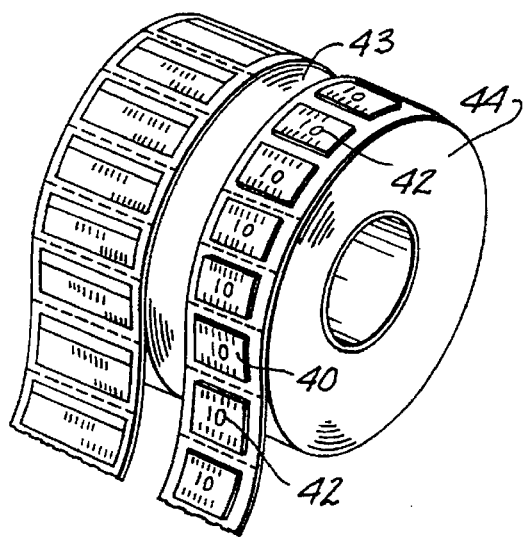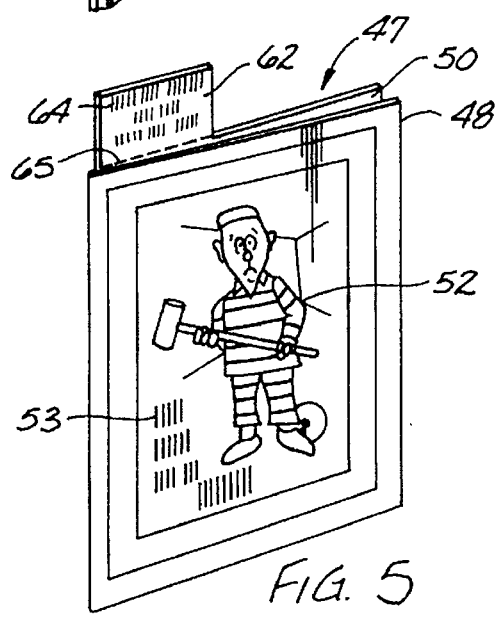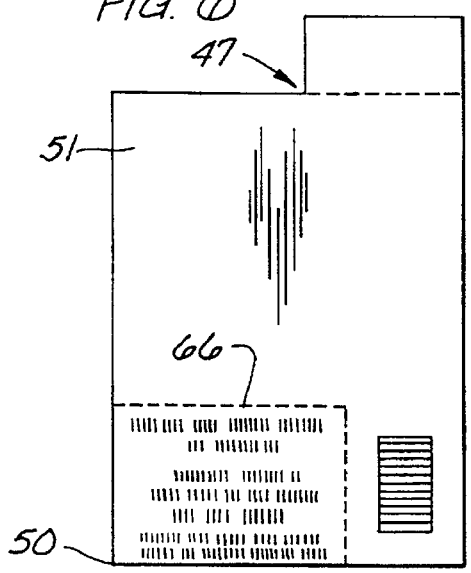

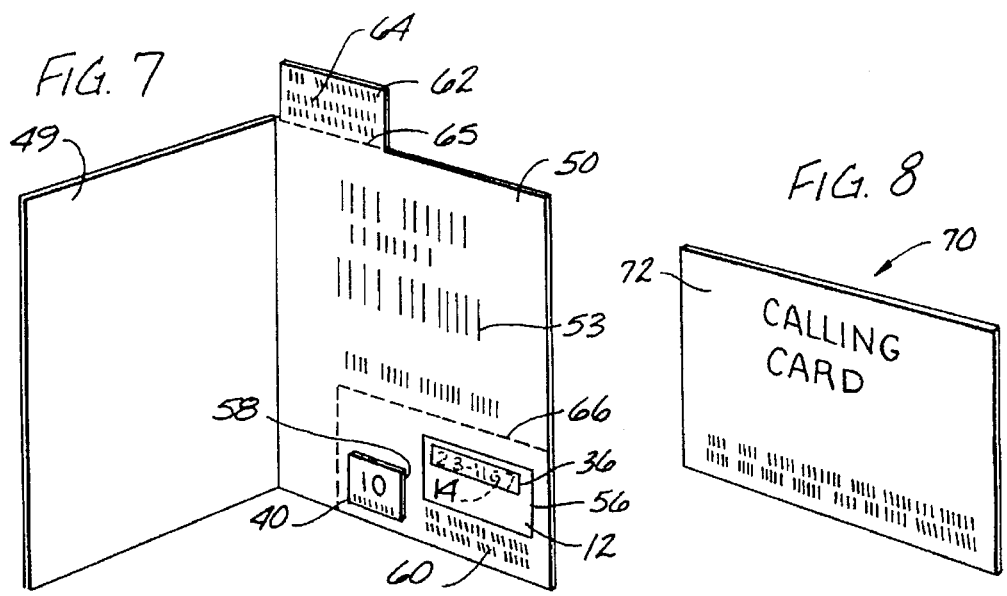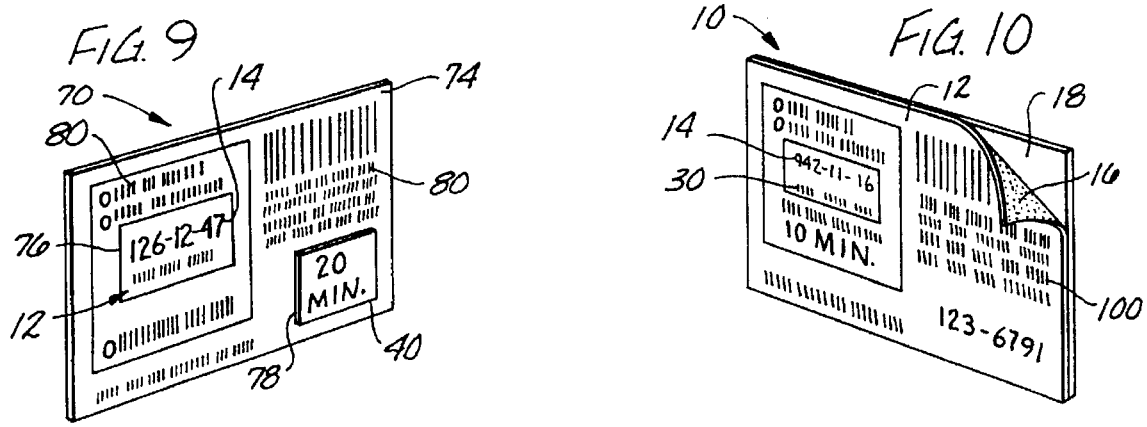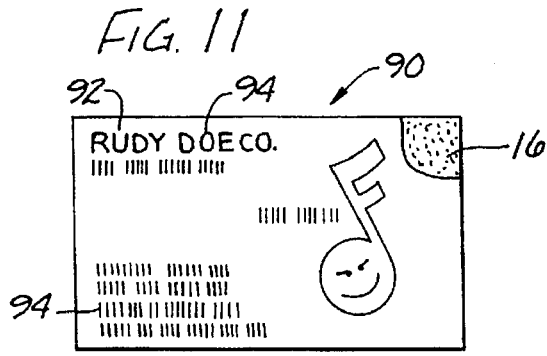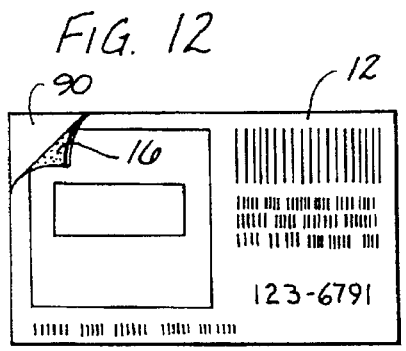

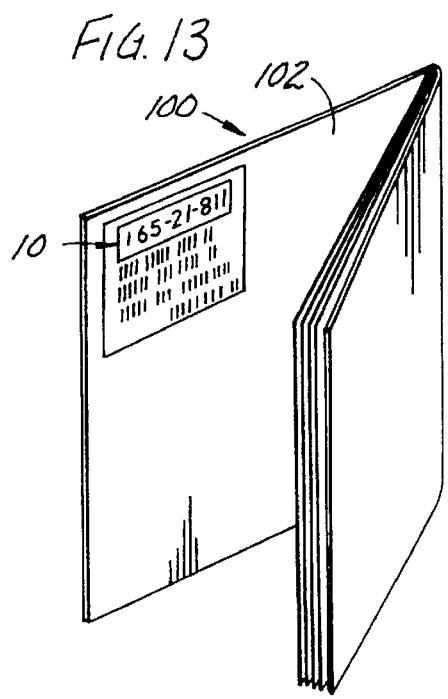
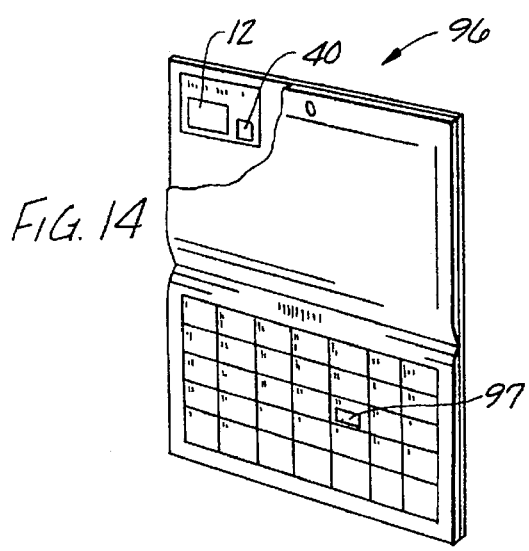
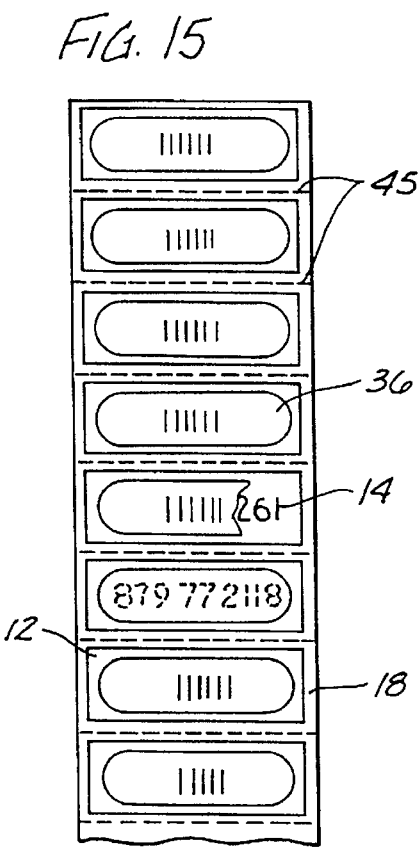
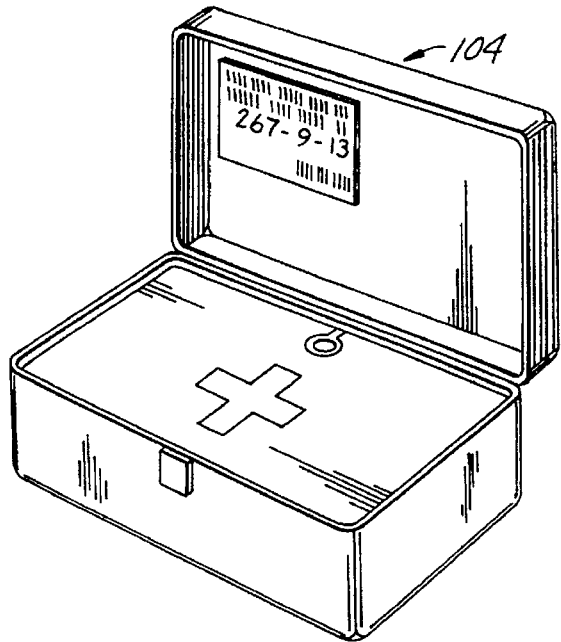

DEBIT CALLING LABEL

BACKGROUND OF THE INVENTION

This invention relates in general to the telephone industry, and in particular to a device and method for providing prepaid telephone calling credit.

A long-standing problem in the telephone industry concerns providing long distance telephone services to customers who are away from their home or business telephones. To address this problem, many local telephone companies and, today, many private companies, provide pay telephones at various public locations. Such pay telephone stations require the user to insert coins into the pay station to place a call. In the case of a long distance call from a pay telephone, the caller must secure and have on hand sufficient coins (usually several dollars for just a few minutes) to cover the long distance telephone charges and, every few minutes the call is interrupted by an operator or an automated attendant asking the caller for more coins to continue the call. This procedure is obviously inconvenient, and more importantly, persons typically do not carry sufficient coins to place a long distance call from a pay telephone.

In attempt to solve this problem, long distance carriers have provided charge calling cards to their credit-worthy customers which allow these users to place local and long distance calls from most telephones by entering a calling card access number imprinted on the face of the charge calling card, and then have the long distance charges billed to the charge calling card account. However, many persons do not have an adequate credit rating to obtain such cards.

Another significant problem concerns theft of the calling card access number. It is common for such thieves to use or sell the numbers associated with such cards, and to thereafter accumulate hundreds and even thousands of dollars in unauthorized charges on the account before the theft is detected from the next monthly billing statement. There are currently criminal rings which steal calling card security numbers with sophisticated surveillance equipment and sell such numbers to unscrupulous buyers. Further, customers with charge calling cards are often assessed a monthly fee, irrespective of actual long distance usage, along with the higher per-minute rates and additional charges called "surcharges" every time the card is used, making the use of these cards an expensive alternative.

Some telephone service providers, therefore, sell debit calling cards which require the caller to prepay for long distance credit, and provide a calling card magnetically coded for the prepaid amount. A major drawback to the use of cards of this specific type is the necessity for special high cost, high technology telephones capable of accepting and reading these cards. The high costs limit the availability of telephones that accept the cards. Further, when the prepaid time runs out, it is inconvenient to prepay for additional time.

Other attempts to solve the problem have included the sale of debit cards in retail establishments which consist of an envelope containing a debit card and a separate label listing the personal identification number that allows access to the long distance telephone network. However, this method is inconvenient and requires a significant amount of space behind the counter at the retail outlet.

In an attempt to overcome the problems associated with selling debit cards at retail outlets, other service providers allow customers to prepay by mail for a disposable calling card. Nevertheless, it is inconvenient to order by mail and there are also time delays before the card is received.

Also, because of the above described problems with prior debit calling card systems, insofar as applicant is aware, there have not been any attempts to provide prepaid long distance credit with other products such as greeting cards, business cards, books, and product manuals. Such applications allow a consumer or seller to provide prepaid long distance credit to a desired recipient. For example, in connection with greeting cards, parents could provide prepaid long distance credit to children away at college to encourage their children to call home, as well as to reduce the cost created by a collect call made from the children to their parents' home. With respect to business cards, the salesperson could hand out business cards with prepaid long distance credit to encourage the recipient to hold on to the card with the hope that he will place a return call to the salesperson to acquire goods or services.

For the reasons discussed above, none of the currently available debit calling cards are highly desirable to the purchasers and ultimate users of the card. Nor do any of the currently available debit calling cards provide an effective or desirable method of providing prepaid long distance credit as a gift or in connection with the sale of goods or services.

OBJECTS AND SUMMARY OF THE INVENTION

It is therefore an object of the present invention to provide prepaid telephone calling credit in the form of a label which can be attached to and/or sold with any of a variety of different complementary items. Another object is to disclose a method of making such a label and a method for using the method in conjunction with various items, such as business cards, disposable calling cards, greeting cards, calenders, books, such as product manuals, and emergency kits. Thus, an object is to provide a debit calling label having an adhesive which allows the calling label to be secured to a variety of items. It is further an object to cover the adhesive with a removable backing so that a purchaser can remove the backing after sale and secure the label to an item of choice when desired.

Another object is to provide an opaque covering affixed to the label and positioned to hide the access identifier so that theft of the access identifier prior to sale is prevented. A related object is to provide such a covering which is readily removable from label to reveal the access identifier after sale to allow the purchaser to place calls against the prepaid calling account associated with the access identifier. An additional object is to provide a unique product reference identifier affixed to the debit calling label for providing inventory and product tracking information related to the debit calling label.

A related object is to provide items for use with the labels. More specifically, an object is to provide items, such as greeting cards, business cards, calenders and calling cards (without account codes printed thereon) which have a designated area for receiving the label and instructions printed thereon for using the label in conjunction with the item. Another object is to provide an additional label having the amount of time associated with the access identifier printed thereon to alert the user of the total amount of time associated with the access identifier. Thus, an object is to provide a method of selling prepaid calling credit which eliminates the need for printing items having different time allotments because the label and desired time allotment associated therewith can be secured to the item.

An alternative object is to also provide a larger debit label which includes the access identifier, the amount of time associated with the identifier, and instructions concerning use of the debit calling label so that the label can be used with items which were not specifically manufactured for use with the debit calling label.

To accomplish these and other objectives, a debit calling label is disclosed which comprises a label, an account code affixed to the label, an adhesive secured to the label, and a backing to removably cover the adhesive. When the backing is removed, the debit calling label is adapted to be secured to an item by the adhesive. The label also preferably comprises a removable covering to hide the access identifier prior to sale. In the preferred embodiment, the label also preferably comprises a product reference number uniquely associated with the account code to provide product tracking and inventory information.

The debit calling label is adapted to be used in conjunction with items, such as business cards, greeting cards, or calling cards which are manufactured with the purpose of being used in connection with the debit calling label. The items preferably have a designated area for securing the debit calling label to the item. The items also preferably include instructions printed thereon that specify how to use the debit calling label to place phone calls against a prepaid calling credit account once the debit calling label is secured to the item.

In an alternative embodiment, the debit calling label also includes instructions affixed to the label which explain use of the debit calling label. This alternative debit calling label is adapted to be used with items which are not specifically manufactured to be used with the debit calling label, such as existing business cards or emergency kits.

The debit calling label is compact and can therefore be stored behind retail store counters without taking up a significant amount of space. The debit calling label allows prepaid telephone credit to be provided in a variety of forms which are desirable and beneficial.

DESCRIPTION OF THE DRAWINGS

In the accompanying drawings which form a part of the specification and are to be read in conjunction therewith and in which like reference numerals are used to indicate like parts in the various views:

FIG. 1 is a front elevational view of the debit calling label showing the account code covered by an opaque covering to hide the account code prior to sale;

FIG. 2 is a front elevational view similar to FIG. 1 showing the opaque covering removed to reveal the account code for use;

FIG. 3 is a perspective view showing a plurality of account labels and time labels adhesively secured to a perforated waxed backing;

FIG. 4 is a perspective view showing the waxed backing and labels on a roll for dispensing the labels;

FIG. 5 is a perspective view showing the front of a greeting card adapted to be used in conjunction with the debit calling label;

FIG. 6 is a back elevational view of the card;

FIG. 7 is a perspective view of the card opened to reveal the areas for securing the account label and time label;

FIG. 8 is a perspective view of the front of a disposable calling card adapted to used in conjunction with the debit calling label;

FIG. 9 is a perspective view of the back of the calling card showing the areas for receiving the account label and time label, as well as instructions printed on the back of the card pertaining to the use of the calling label;

FIG. 10 is a perspective view of the back of the calling card showing an alternative embodiment of the calling label in which the account identifier, the time amount, and the instructions are all printed on the label being secured to the back of the card;

FIG. 11 is a front elevational view of a business card adapted to be used in conjunction with the debit calling label;

FIG. 12 is a back elevational view of the business card showing the label of FIG. 10 being secured thereto;

FIG. 13 is a perspective view showing the label of FIG. 10 being secured to the inside cover of a book, such as a product reference manual;

FIG. 14 is a perspective view showing the calling labels of FIGS. 3 and 4 secured to the inside cover of a calendar;

FIG. 15 is a front elevational view showing a calling label constructed according to an alternative embodiment in which only the access identifier is applied to the label; and FIG. 16 is a perspective view showing the calling label of FIG. 10 secured to the inside lid of an emergency kit.

DETAILED DESCRIPTION OF THE PREFERRED EMBODIMENTS

Referring to FIG. 1, the debit calling label constructed according to a preferred embodiment of the present invention is generally designated 10. The debit label 10 generally includes a label 12, an access identifier 14, an adhesive 16, and a backing 18 (the latter two being shown in FIG. 3).

Label 12 must be adapted to be printed upon and should also be durable. The label is preferably made from a material such as a cardboard stock or plastic. Label 12 has a front side 20 upon which access identifier 14 is affixed and a back side 22 upon which the adhesive 16 is secured.

Access identifier 14 is preferably imprinted on the front side 20 of label 12 in a suitable ink or the like, and it is, therefore, permanently attached or affixed to the label. The access identifier should be composed of a sufficient number of characters to reasonably preclude someone from guessing the composition of the identifier number, preferably between 6 and 16 characters. Identifier 14 could be composed of any numbers or letters, but is preferably a nonsequential number randomly generated by computer for each specific card composed of a combination of numbers and/or letters to uniquely identify a particular debit label 10 and act as a security identifier for access to the telephone network and use thereof. A consumer purchasing the debit label acquires the prepaid account having a designated amount of prepaid calling time associated therewith, as will be explained in greater detail below.

Adhesive 16 is applied to the back side 22 of label 12. Backing 18 removably adheres to and covers the adhesive until the debit label is purchased and it is desired to secure the debit label to an item. The backing is preferably a waxed paper which sufficiently adheres to the adhesive to hold the debit label in place on the waxed paper, but which also allows the adhesive to be reused to secure the debit label to an item once the waxed paper is removed. The application of such adhesives and backings to a paper or plastic label is well known in the art.

Referring to FIG. 1, a product reference number 30 is also affixed to the front side 20 of label 12, such as by printing. The identifier 20 could be any numbers or letters, but is preferably a sequential and unique number (possibly consisting of a combination of letters and digits). The product reference number allows the debit label provider to inventory the labels and to therefore provide the debit labels to retail stores as an over-the-counter product, much like any other product found in a retail store, or on a consignment basis. The number is sequential for each card as it is manufactured, and is assigned by computer to the specific access identifier 14 printed and assigned to the specific label being manufactured, so that the access identifier and the product reference identifier number are "matched pairs." This method provides security in the manufacturing process and an accurate method for tracking the inventory and sales information related to the debit label. The product reference number also provides cross referencing to the unique random access identifier 14. The inventory tracking of the product reference number and access identifier should be performed by a computer coupled to the telephone network, as is well known in the phone industry. Further, the product reference number can be associated with a bar code which is readable by scanners to automate tracking of the debit calling labels 10.

To ensure that users of the debit calling label 10 correctly recognize the access identifier as the account code, access identifier 14 is preferably printed in larger print than product reference number 30. The access identifier is preferably printed in fourteen (14) point or larger, and the product reference number is preferably printed in six (6) point or smaller, but still readable. Further, the access identifier is preferably printed on the upper center portion of label 12, and the product number is preferably printed in a lower corner.

After the ink of access identifier 14 is affixed to label 12, a protective transparent coating (not shown) is then preferably permanently applied to the label over the area of access identifier 14. This transparent coating preferably comprises a transparent, hardenable material such as transparent enamel, UV varnish, lacquer paint, or other suitable conventionally available transparent material. The material is flowed, sprayed, or otherwise affixed by conventional techniques onto the card. This operation may be carried out as a part of the printing process. It is to be understood that a transparent material applied in other than a liquid or semi-liquid form could also be employed if desired.

Referring to FIG. 1, an opaque covering 36 is also preferably affixed to label 12 over the transparent coating, but is removable therefrom (as shown in FIG. 2) to allow the user to view the access identifier 14 after the debit label 10 has been purchased. Covering 36 prevents misappropriation of identifier 14 prior to the purchase of the debit label. The protective transparent coating forms a smooth bonding surface to which covering 36 can reliably and evenly adhere. Without such a protective coating, covering 36 might not reliably or fully adhere to the access identifier 14 portion of label 12, resulting in irregularities and unevenness in the surface of the covering. It is important that the access identifier be completely hidden by covering 36, which covering can be colored or overprinted for additional coverage. Further, the coating prevents inadvertent removal of access identifier 14 from label 12 when covering 36 is being scraped or removed from the label. It is also important that the covering be of such a nature that it cannot be replaced after removal so that tampering with the debit label 10 prior to sale can readily be ascertained.

In the preferred embodiment, covering 36 can be a colored wax coating which can be applied over the access identifier and subsequently scraped from label 12 to reveal the hidden access identifier 14 at the time of sale. Also, the wax coating could be applied to a clear tag with an adhesive backing. Such a tag would allow the tag to be adhesively affixed over the access identifier which would allow the label 10 to be printed with conventional, less expensive equipment on site so that the more expensive wax coated tags can be bought from a larger manufacturer having the equipment required to apply wax coatings. Once the wax coating is removed from the clear tag, the access identifier is revealed and the clear tag prevents inadvertent removal of the access identifier, such as might occur when the wax coating is being scraped off of the label. The transparent coating described above is not necessary if the clear tag is secured over the access identifier. In either embodiment, such colored wax coatings and means of affixation to card stock and the like are well-known in the art and therefore will not be described further herein. The coating may alternatively be a latex material, enamel material, or any other suitable opaque covering material conventionally available. Also, a scored opaque tag could be used to hide the access identifier. The scored tag tears if it is removed from the access identifier after the tag is adhesively secured over the identifier, and thus would indicate if the debit calling label had been tampered with prior to sale. Such scored tags are commonly used as price tags in stores to prevent removal of the price tag from an item and subsequent placement on a more expensive item.

Referring to FIG. 3, the backing 18 also has a time label 40 designating a particular amount of time secured thereto by adhesive 41. The time label is adhesively secured to the backing in the same manner described above for the label 12. The time label 40 has a numeral 42 printed thereon indicating the amount of time associated with the corresponding access identifier 14.

Referring to FIG. 4, label 12 and the corresponding time label 40 could be printed in bulk on a rolls 43 and 44, respectively. While the rolls could be combined to form one roll, the individual rolls allow any roll of debit calling labels 10 to be associated with any roll of time labels 40. A computer (not shown) can be programmed to associate a particular access identifier with a specific amount of time at the time of sale to the retail location. At the point of purchase, a dispenser (not shown) can be used to ensure that the correct time label is dispensed and used with the correct access identifier label. Each roll should include perforations 45 on the backing 18 (i.e., waxed paper) to facilitate separation of debit labels.

Label 12 and label 40 are adapted to be used in conjunction with products which are manufactured with the purpose of being used with the labels. While there are numerous uses for the calling debit labels, four such contemplated uses are shown in FIGS. 5–14. FIGS. 5–7 show a greeting card 47. Card 47 includes a cover page 48, middle pages 49 and 50, and a back page 51. As is typical in the industry, cover page 48 includes a picture 52 and a greeting 53. In the preferred embodiment, either of the middle pages (as shown, page 50) should include appropriately sized areas 56 and 58 for receiving label 12 and label 40, respectively. The middle page should also include preprinted instructions 60 for placing phone calls against the prepaid credit associated with the access identifier 14 of the debit label. Time label 40 is also preferably placed in area 58 to remind the user of the total time associated with the access identifier. The card can also include a tab 62 which extends above the top edge of the card when it is closed. Tab 62 has instructions 64 which alert the purchaser of the need to acquire a debit calling label from the store clerk to provide prepaid calling credit with the greeting card. Perforations 65 are provided to allow the tab to be removed from card 47 prior to insertion into a greeting card envelope (not shown). Further, perforations 66 can be formed on page 50 of the card 47 to facilitate separation of a "calling card sized" portion of page 50 therefrom for convenient storage in a wallet or the like.

Referring to FIGS. 8 and 9, label 12 and label 40 can also be used in connection with a disposable calling card 70 made out of cardboard or the like. The front 72 of card 70 can have a trademark 74 or other title for the card. The back 74 of card 70 includes appropriately sized areas 76 and 78 for receiving label 12 and label 40, respectively. Back 74 also has preprinted instructions 80 for using the calling card 70 to place phone calls against the prepaid credit of the debit label. Time label 40 is also preferably placed in area 78 to remind the user of the total time associated with the particular access identifier.

Referring to FIG. 11, a business card 90 is shown which is identical to calling card 70 in all respects, except that on the front 92 of the business card there is information 94 printed thereon pertaining to the identity and work place of the business card owner. The back of the business card 90 is identical to the back of the calling card 70 (as shown in FIG. 9), and thus has areas for receiving label 12 and label 40 and also has instructions pertaining to the use of the card. Such business cards obviously must be printed for special use with the debit label 10. The use of the debit label with business cards allows the business card owner to provide prepaid phone credit to desired customers to encourage the recipient of the card to hold on to the card due to its added value, and to hopefully return a call to the business person to purchase goods or services.

Referring to FIG. 14, a calender 96 is shown which has areas on the inside cover for receiving labels 12 and 40 and also has instructions pertaining to use of the card with the calender. The calender, as is well known, provides spaces for each day of the month. Each month preferably has a space including a message 97 reminding the recipient to call home. The access identifier 14 associated with the calender is automatically programmed to provide a specified amount of time each month for the access identifier as of a specific date. In use, the parents of a college student could provide the calender to their son or daughter to encourage a call home at least once a month. The number of times each month that the account associated with the access identifier is updated can be varied to accommodate different consumer demands. Such calenders also have use for businesses that have customers that place long distance orders at least once a month.

Greeting card 47, calling card 70, business card 90, and calender 96 are manufactured specifically to be used with labels 12 and 40. As such, the cards have designated areas for the labels and instructions printed thereon pertaining to use of the debit label 10.

Nevertheless, the debit label is adapted to be used with a variety of existing products and to satisfy variety of calling needs. However, products which were or are not manufactured for specific use with the debit calling label obviously will not have areas for placing labels 12 and 40, nor will such items have instructions pertaining to the use of debit label 10. Thus, in an alternative embodiment, the debit calling label 10 includes the label 12 which has printed thereon access identifier 14, product reference number 30, instructions 100, and a number 102 corresponding to the amount of time associated with the debit label 10, as shown in FIG. 10. All of the information is printed on label 12 which is larger than the label 12 shown in FIGS. 1–4 to accommodate the increased amount of information printed thereon. The label of this embodiment is adapted to be removed from the backing 18 and to be secured to an item by adhesive 16 exactly as explained for the debit calling label shown in FIGS. 1–4. However, because the label of this embodiment includes all necessary information pertaining to use of the label, it can be applied to items of the user's choice which were not manufactured specifically for use with the debit calling label 10.

Referring to FIG. 11, the label could be used with existing business cards by applying it to the back of the business card which is typically blank. Referring to FIG. 13, the label could also be used on a book 100, such as a product reference manual, and more specifically could be applied to the inside cover 102. Thus, businesses providing such manuals would not be required to provide an "800" phone number, but, rather, could provide a designated amount of prepaid calling time to the purchaser. Referring to FIG. 16, the label 10 could also be applied to an emergency kit 104, such as are stored in the trunk of a vehicle. The uses of the modified label 10 are only limited by imagination and need.

It should also be understood that there may be instances when only the access identifier 14 is necessary. For instance, for small time allotment cards which are printed in bulk, the small cost of such cards might obviate the need for inventory tracking, and thus the product reference number 30 may be unnecessary. Further, there may be repeat customers who do not need the instruction portion of the debit label. Thus, FIG. 15 shows an alternative embodiment of the debit calling label 10 in which the label portion 12 only has the access identifier 14 printed thereon.

As is apparent from the foregoing description, to use the debit calling label 10, the label 12 must be removed from the backing 18 to expose the adhesive 16. Once the adhesive is exposed, the debit label is adapted to be secured to an item by the adhesive. Further, when label 12 is sold with time label 40, the time label is secured to the item in the same manner to indicate the total amount of time allocated to the access identifier 14.

The labels 12 and 40 (shown in FIGS. 3 and 4) are particularly adapted to be used with items specifically manufactured for use with the debit calling label 10. For items not so specifically manufactured, the debit calling label (shown in FIG. 10) having instructions printed thereon is more suited for being applied to such items.

From the foregoing, it will be seen that this invention is one well adapted to attain all the ends and objects hereinabove set forth, together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described the invention, what is claimed is:

1. A method for providing access to telephone services through a label for interactive communication, the label being selectively securable to an item, the method comprising the steps of:

establishing a calling account having prepaid calling credit associated therewith;

providing a unique access identifier for the calling account;

providing a label;

affixing to said label the unique access identifier for identifying the calling account;

applying an adhesive to the label for securing said label to an item; and covering the adhesive with a selectively removable backing material whereby the user may selectively remove the backing material from the adhesive to expose the adhesive and secure the label to an item selected by the user.

2. The method of claim 1 further comprising the steps of selecting an item on which to apply the label, removing the backing material from the adhesive and applying the label to the item.

3. The method of claim 2 wherein the item comprises a greeting card.

4. The method of claim 3 further comprising the step of removably securing a tab to the greeting card and affixing information to the tab stating the need to attach the debit calling label to the greeting card to obtain calling credit.

5. The method of claim 4 further comprising the step of affixing instructions to the greeting card describing use of the debit calling label to place telephone calls against the prepaid credit associated with said unique access identifier and further comprising forming perforations around the access identifier and instructions to facilitate removal of a portion of the greeting card therefrom.

6. The method of claim 2 wherein the item comprises a calling card having instructions affixed thereto describing use of the debit calling label to place telephone calls against the prepaid credit associated with said unique access identifier.

7. The method of claim 2 wherein the item is a business card having instructions affixed thereto describing use of the debit calling label to place telephone calls against the prepaid credit associated with said unique access identifier.

8. The method of claim 2 wherein the item is a calender having instructions affixed thereto describing use of the debit calling label to place telephone calls against the prepaid credit associated with said unique access identifier.

9. A debit calling label constructed to be securable to an item selected by the user and further constructed to allow remote crediting of telephone charges against a prepaid account to enable interactive communication, the debit calling label comprising:

a label having a front face and a rear face;

a visually discernable access identifier affixed to the front face of the label, the access identifier enabling the user to access the prepaid account;

an adhesive secured to the rear face of the label; and a backing material releasably mounted on the adhesive, the backing material being selectively removable from the adhesive to expose the adhesive for adhering the label to a selected item.

10. The debit calling label of claim 9 further comprising an opaque covering affixed to the label and positioned to hide said access identifier, said opaque covering being removable from said label for allowing viewing of said access identifier so that the debit calling label can be made available for merchandising without revealing the access identifier.

11. The debit calling label of claim 10 further comprising a unique product reference identifier affixed to said label for providing inventory and product tracking information related to said debit calling label.

12. The debit calling label of claim 11 further comprising a permanent transparent coating affixed to the label over said access identifier to prevent inadvertent removal of the identifier from the debit calling label, said permanent transparent coating being positioned under said opaque covering, whereby said permanent transparent coating provides a bonding surface to which said opaque covering may reliably and evenly adhere.

13. The debit calling label of claim 12 wherein said opaque covering comprises a colored wax covering that adheres to the surface of said coating so that said opaque covering can be easily removed to reveal said access identifier.

14. The debit calling label of claim 13 wherein said access identifier is randomly generated by a computer.

15. The debit calling label of claim 14 wherein said unique product reference identifier is sequential, and is tied by computer data base to the specific access identifier on each label.

16. The debit calling label of claim 15 further comprising a second label having a number indicating the amount of calling time associated with the access identifier, the second label having an adhesive secured to the second label and backing removably secured to the adhesive.

17. A method for providing access to telephone services to consumers through retail distribution of a label for enabling interactive communication, the label being selectively securable by the consumer to an item, the method comprising the steps of:

establishing a calling account having prepaid calling credit associated therewith;

providing a unique access identifier for the calling account;

providing a label;

affixing to said label the unique access identifier for identifying the calling account;

affixing a selectively removable opaque covering positioned to hide said unique access identifier, said opaque covering being selectively removable from said label for allowing viewing of said unique access identifier so that the label can be made for merchandising without revealing the access identifier;

affixing a unique product reference identifier to said label for providing inventory and product tracking information related to said label;

affixing instructions to the label describing use of the label to place telephone calls against the prepaid credit associated with said unique access identifier;

applying an adhesive to the label for securing said label to an item; and covering the adhesive with a selectively removable backing material whereby the user may selectively remove the backing material from the adhesive to expose the adhesive and secure the label to an item selected by the consumer.

18. The method of claim 17 further comprising the step of removing the backing from the adhesive and applying the debit calling label to an item.

19. The method of claim 18 wherein the item comprises a business card.

20. The method of claim 18 wherein the item comprises an emergency kit.

21. The method of claim 18 wherein the item comprises a book.

22. The method of claim 18 wherein the item comprises a calender.

\* \* \* \* \*